United States Patent
Arakawa et al.

(10) Patent No.: US 11,445,078 B2
(45) Date of Patent: Sep. 13, 2022

(54) SHEET FEEDER AND IMAGE FORMING APPARATUS

(71) Applicant: Brother Kogyo Kabushiki Kaisha, Nagoya (JP)

(72) Inventors: Takashi Arakawa, Nagoya (JP); Mariko Uchida, Nagoya (JP); Tetsuya Morita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/029,196

(22) Filed: Sep. 23, 2020

(65) Prior Publication Data
US 2021/0099591 A1 Apr. 1, 2021

(30) Foreign Application Priority Data

Sep. 30, 2019 (JP) .............................. JP2019-180468

(51) Int. Cl.
*H04N 1/00* (2006.01)
*B65H 3/06* (2006.01)
*B65H 1/08* (2006.01)

(52) U.S. Cl.
CPC .......... *H04N 1/00602* (2013.01); *B65H 1/08* (2013.01); *B65H 3/0669* (2013.01);
(Continued)

(58) Field of Classification Search
CPC .......... H04N 1/00602; H04N 1/00538; H04N 1/00628; H04N 1/1017; H04N 1/12; H04N 1/00604; H04N 1/00347; H04N 1/00541; H04N 1/00588; H04N 1/00591; H04N 1/0062; H04N 1/00631; H04N 1/04; H04N 1/0464; H04N 1/193; H04N 1/203; H04N 1/2032; H04N 2201/0081; B41J 11/0095; B41J 13/103; B65H 1/08; B65H 1/14; B65H 1/266; B65H 2405/324; B65H 2405/325; B65H 2801/06; B65H 3/0661;
(Continued)

(56) References Cited

U.S. PATENT DOCUMENTS 6,502,497 B1 * 1/2003 Durand .................. B64D 47/08
89/41.21
10,569,979 B2 * 2/2020 Ito ............................ B65H 1/04
(Continued)

FOREIGN PATENT DOCUMENTS

JP 2015-151265 A 8/2015
JP 2016-222439 A 12/2016

*Primary Examiner* — Negussie Worku
(74) *Attorney, Agent, or Firm* — Burr & Brown, PLLC

(57) ABSTRACT

A sheet feeder includes a separation roller, a retard roller, and a return latch. The separation roller rotates in a forward direction to separate a sheet and transport the separated sheet in a sheet transport direction. The retard roller forms, together with the separation roller, a nip point and rotates in a reverse direction to return a sheet in a direction opposite to the sheet transport direction. The return latch moves from a retracted position to a protruding position to return a sheet remaining after separation by the separation roller to a position upstream of the nip point in the sheet transport direction. The return latch, when at the retracted position, is retracted from a sheet transport path and, when at the protruding position, protrudes to the sheet transport path.

11 Claims, 12 Drawing Sheets

(52) U.S. Cl.
CPC ......... *B65H 3/0676* (2013.01); *B65H 3/0684* (2013.01); *H04N 1/00604* (2013.01); *H04N 1/00628* (2013.01)

(58) Field of Classification Search
CPC .. B65H 3/0669; B65H 3/0676; B65H 3/0684; B65H 3/5261; B65H 3/565
USPC ........................................................ 358/498
See application file for complete search history.

(56) References Cited

U.S. PATENT DOCUMENTS

| | | | |
|---|---|---|---|
| 2003/0210433 A1* | 11/2003 | Westcott | H04N 1/04 358/474 |
| 2004/0251608 A1* | 12/2004 | Saito | B65H 29/34 271/220 |
| 2005/0051943 A1* | 3/2005 | Yamanaka | B41J 11/0095 271/10.01 |
| 2016/0355358 A1 | 12/2016 | Murakami et al. | |
| 2020/0195708 A1* | 6/2020 | Danjo | G06F 17/18 |
| 2020/0207566 A1* | 7/2020 | Tatematsu | B65H 9/12 |
| 2021/0087005 A1* | 3/2021 | Uchida | B65H 3/06 |

* cited by examiner

SHEET FEEDER AND IMAGE FORMING APPARATUS

CROSS-REFERENCE TO RELATED APPLICATION

This application claims priority from Japanese Patent Application No. 2019-180468 filed on Sep. 30, 2019, the content of which is incorporated herein by reference in its entirety.

TECHNICAL FIELD

Aspects of the disclosure relate to a sheet feeder and an image forming apparatus including the sheet feeder.

BACKGROUND

A known image forming apparatus, such as a laser printer, includes a sheet feeder configured to feed a sheet from a sheet tray. The sheet feeder typically includes a feed roller and a separation roller. In order to improve sheet separation performance of the separation roller, a retard roller has been proposed to be disposed facing the separation roller.

Various types of retard rollers have been proposed, including a retard roller configured to rotate in a reverse direction to transport a sheet in a direction opposite to a sheet transport direction. Such a retard roller is called an active retard roller and configured to, when the separation roller feeds an uppermost sheet in the sheet transport direction, return the remaining sheets in the direction opposite to the sheet transport direction.

SUMMARY

While the active retard roller is effective to improve sheet separation performance, it is still difficult to completely prevent multiple-sheet feeding. For example, using glossy sheets, which tend to stick to each other, may cause multiple-sheet feeding.

Aspects of the disclosure provide a sheet feeder including an active retard roller and configured to reliably reduce multiple-sheet feeding, and also provide an image forming apparatus including the sheet feeder.

According to one or more aspects of the disclosure, a sheet feeder includes a separation roller, a retard roller, and a return latch. The separation roller is configured to rotate in a forward direction to separate a sheet and transport the separated sheet in a sheet transport direction. The retard roller is configured to form, together with the separation roller, a nip point and rotate in a reverse direction to return a sheet in a direction opposite to the sheet transport direction. The return latch is configured to move from a retracted position to a protruding position to return a sheet remaining after separation by the separation roller to a position upstream of the nip point in the sheet transport direction. The return latch, when at the retracted position, is retracted from a sheet transport path and, when at the protruding position, protrudes to the sheet transport path.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

Figure 1:
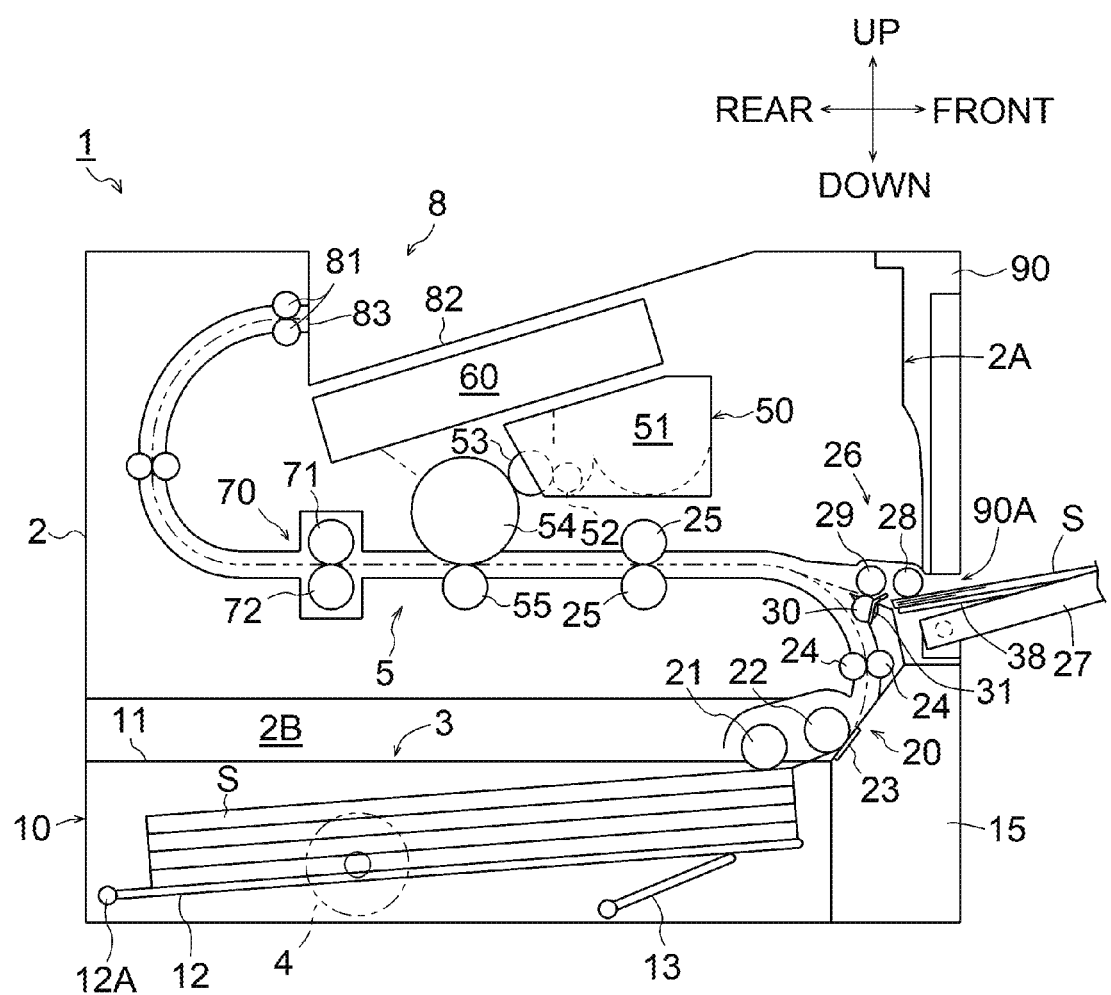
FIG. 1 is a central cross-sectional view of an image forming apparatus according to an illustrative embodiment of the disclosure.

In the following description, directions are defined with reference to an image forming apparatus 1 disposed in an orientation in which it may be intended to be used, as shown in FIG. 1. A side provided with a multipurpose tray (hereinafter referred to as an MP tray) 27 is the front, the opposite side is the rear, and a left-right direction is defined when the image forming apparatus 1 is viewed from the front. A side provided with a discharge tray 82 is an upper side, and the opposite side is a lower side.

Overall Structure of Image Forming Apparatus

The image forming apparatus 1 includes a housing 2, a supply unit 3, a motor 4, an image forming unit 5, and a discharge unit 8.

The supply unit 3 is disposed at lower and front portions of the image forming apparatus 1 to transport sheets S held in the supply unit 3 to the image forming unit 5. The image forming unit 5 is disposed downstream of the supply unit 3 in a sheet transport direction to form an image on a sheet S transported from the supply unit 3. The discharge unit 8 is disposed downstream of the image forming unit 5 in the sheet transport direction to discharge the sheet S with the image formed thereon by the image forming unit 5 to an exterior of the image forming apparatus 1.

The supply unit 3 includes, at a lower portion of the image forming apparatus 1, a sheet cassette 10, a feed mechanism 20, transport rollers 24, registration rollers 25 and, at a front portion of the image forming apparatus 1, a front cover 90 and a multipurpose (MP) feed mechanism 26 as an example of a sheet feeder.

The sheet cassette 10 is detachably attached to a sheet cassette mount 2B formed at a lower portion of the housing 2. The sheet cassette 10 is inserted, from the front toward the rear, into the sheet cassette mount 2B to be positioned at an attached position. The sheet cassette 10 is withdrawn, from the rear toward the front, from the sheet cassette mount 2B to be positioned at a withdrawn position.

The sheet cassette 10 includes a cassette main body 11 for supporting one or more sheets S, a pressure plate 12 disposed in the cassette main body 11 to hold stacked sheets S and vertically move the sheets S, and a pressure plate lifter 13 for lifting the pressure plate 12.

The pressure plate 12 is pivotably supported, at a pivot support 12A, to be vertically movable. The pressure plate lifter 13 is driven by the motor 4 such that its distal end is raised. The pressure plate lifter 13 is raised to lift the pressure plate 12 such that the sheets S stacked on the pressure plate 12 reach a feedable position, as shown in FIG. 1.

The feed mechanism 20 picks up a sheet S by separating from the other sheets S stacked on the sheet cassette 10 and transports the sheet S toward the transport rollers 24. The feed mechanism 20 includes a pickup roller 21, a separation roller 22, and a separation pad 23.

The pickup roller 21 is disposed above the pressure plate 12 to pick up sheets S lifted by the pressure plate 12 to the feedable position. The separation roller 22 is disposed downstream of the pickup roller 21 in the sheet transport direction. The separation pad 23 is disposed facing the separation roller 22 and is urged toward the separation roller 22.

The sheets S picked up by the pickup roller 21 are fed toward the separation roller 22, and a single sheet S is separated from the other sheets S between the separation roller 22 and the separation pad 23 and is transported by the separation roller 22 toward the transport rollers 24.

The transport rollers 24 are disposed downstream of the feed mechanism 20 in the sheet transport direction to apply a transport force to the sheet S. The sheet S transported from the feed mechanism 20 to the transport rollers 24 are transported toward the registration rollers 25.

The registration rollers 25 are disposed downstream of the transport rollers 24 in the sheet transport direction. The registration rollers 25 restrict movement of the transported sheet S to temporarily stop the sheet S, and then transport the sheet S at a predetermined timing toward a transfer position.

The housing 2 has, at its front surface, a first opening 2A for removal of jammed sheets S and/or replacement of the image forming unit 5. A front cover 90 is attached to the first opening 2A to be openable/closable about its lower end. The front cover 90 has a second opening 90A through which sheets S are supplied. The MP tray 27 is attached at the second opening 90A, as a sheet tray openable/closable about its lower end. The MP tray 27 is pivotable between a stored position to cover the second opening 90A, and a usable position (shown in FIG. 1) to open the second opening 90A. The MP tray 27, when at the usable position, is configured to support one or more sheets S.

The MP feed mechanism 26 picks up a sheet S by separating from the other sheets S supported on the MP tray 27 and transports the sheet S toward the registration rollers 25. The MP feed mechanism 26 includes the MP tray 27, a pickup roller 28 as an example of a feed roller, a separation roller 29, an active retard roller 30, and return latches 31.

The pickup roller 28 picks up sheets S supported on the MP tray 27. The separation roller 29 is disposed downstream of the pickup roller 28 in a sheet transport direction and rotates, by a driving force from the motor 4, in a forward direction. The separation roller 29 rotating in the forward direction refers to the separation roller 29 rotating in such a direction that a sheet S is transported downstream in the sheet transport direction.

The retard roller 30 is disposed below the separation roller 29. The retard roller 30 is urged toward the separation roller 29 and forms, together with the separation roller 29, a nip point. The retard roller 30 functions as an active retard roller by rotating, by a driving force from the motor 4, in a reverse direction, which is opposite to the forward direction. The retard roller 30 rotating in the reverse direction refers to the retard roller 30 rotating in such a direction that a sheet S is transported upstream in the sheet transport direction.

The return latches 31 are each disposed on a corresponding one of opposite sides, i.e., on the left or right side, of the retard roller 30 in its rotational axial direction. The return latches 31 return one or more sheets S remaining after separation by the separation roller 29 to a position more upstream than the nip point of the separation roller 29 in the sheet transport direction. Each return latch 31 is movable between a retracted position (refer to FIG. 12) where the return latch 31 is retracted away from a transport path, and a protruding position (refer to FIG. 11) where the return latch 31 protrudes into the transport path to contact leading edges of the sheets S remaining after separation by the separation roller 29 and return the sheets S more upstream than the nip point of the separation roller 29 in the sheet transport direction.

The sheets S picked up by the pickup roller 28 are fed toward the separation roller 29 to be separated one from another between the separation roller 29 and the retard roller 30. The separated sheet S is transported by the separation roller 29 toward the registration rollers 25. At this time, one or more sheets S fed together with the separated sheet S are returned, by the retard roller 30 and the return latches 31, toward the MP tray 27. Thus, the return latches 31 in addition to the active retard roller 30 further reduce multiple-sheet feeding than when only the active retard roller 30 is provided for separating sheets S.

The image forming unit 5 includes a process cartridge 50 for transferring an image onto a surface of a sheet S transported from the supply unit 3, an exposure unit 60 for exposing to light a surface of a photosensitive drum 54 of the process cartridge 50, and a fixing unit 70 for fixing the image transferred by the process cartridge 50 onto the sheet S.

The process cartridge 50 is disposed in the housing 2 at a position above the sheet cassette mount 2B. The process cartridge 50 includes a developer storage 51, a supply roller 52, a developer roller 53, a photosensitive drum 54, and a transfer roller 55.

The developer storage 51 stores therein toner as a developer. The toner stored in the developer storage 51 is agitated and fed to the supply roller 52 by an agitator (not shown). The supply roller 52 supplies the toner fed from the developer storage 51 to the developer roller 53.

The developer roller 53 is disposed in close contact with the supply roller 52 to carry thereon the toner supplied from the supply roller 52. A bias applying unit (not shown) applies a developing bias to the developer roller 53.

The photosensitive dram 54 is disposed adjacent to the developer roller 53. After a charger (not shown) uniformly charges a surface of the photosensitive drum 54, the exposure unit 60 exposes the surface of the photosensitive drum 54 to light. Exposed portions of the photosensitive drum 54 have a lower electric potential than the other portions, and thus an electrostatic latent image is formed on the photosensitive drum 54 based on image data. The developer roller 53 supplies charged toner to the surface of the photosensitive drum 54 with the electrostatic latent image formed thereon, thereby forming a visible developer image.

The transfer roller 55 is disposed facing the photosensitive drum 54. A bias applying unit (not shown) applies a transfer bias to the transfer roller 55. In a state where the transfer bias is applied to a surface of the transfer roller 55, the photosensitive drum 54 with the developer image formed thereon and the transfer roller 55 nip and transport the sheet S therebetween (at the transfer position), thereby transferring the developer image formed on the surface of the photosensitive drum 54 onto a surface of the sheet S.

The exposure unit 60 includes a laser diode, a polygon mirror, lenses, and reflection mirrors and expose a surface of the photosensitive drum 54 by irradiating the surface with a laser beam based on the image data input in the image forming apparatus 1.

The fixing unit 70 includes a heat roller 71 and a pressure roller 72. The heat roller 71 is driven to rotate by a driving force from the motor 4. The heat roller 71 is supplied with electricity by a power supply (not shown) and heated. The pressure roller 72 is disposed facing the heat roller 71 and is closely contacted and rotated by the heat roller 71. When the sheet S with the developer image transferred thereon is transported to the fixing unit 70, the heat roller 71 and the pressure roller 72 nip and transport the sheet S, thereby fixing the developer image onto the sheet S.

The discharge unit 8 includes discharge rollers 81, a discharge dray 82, and a discharge port 83. The discharge rollers 81 are provided in pair to discharge the sheet S transported from the fixing unit 70 toward an exterior of the housing 2. The discharge tray 82 is formed on an upper surface of the housing 2 and receives, in a stacked manner, the sheet S discharged by the discharge rollers 81 through the discharge port 83 to the exterior of the housing 2.

Structure of MP Feed Mechanism

Figure 2:
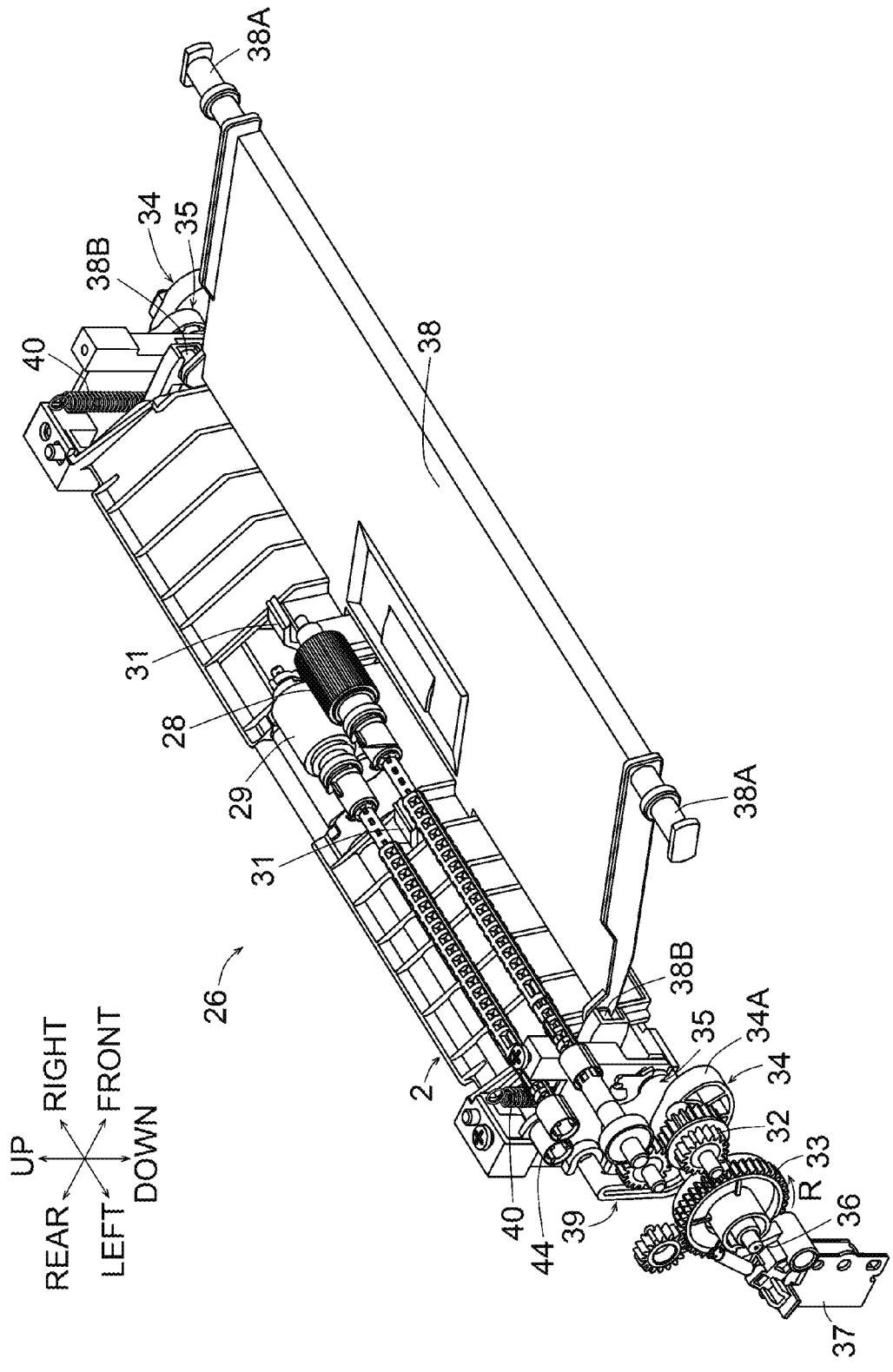
FIG. 2 is a front perspective view showing substantial elements of an MP feed mechanism.
Figure 3:
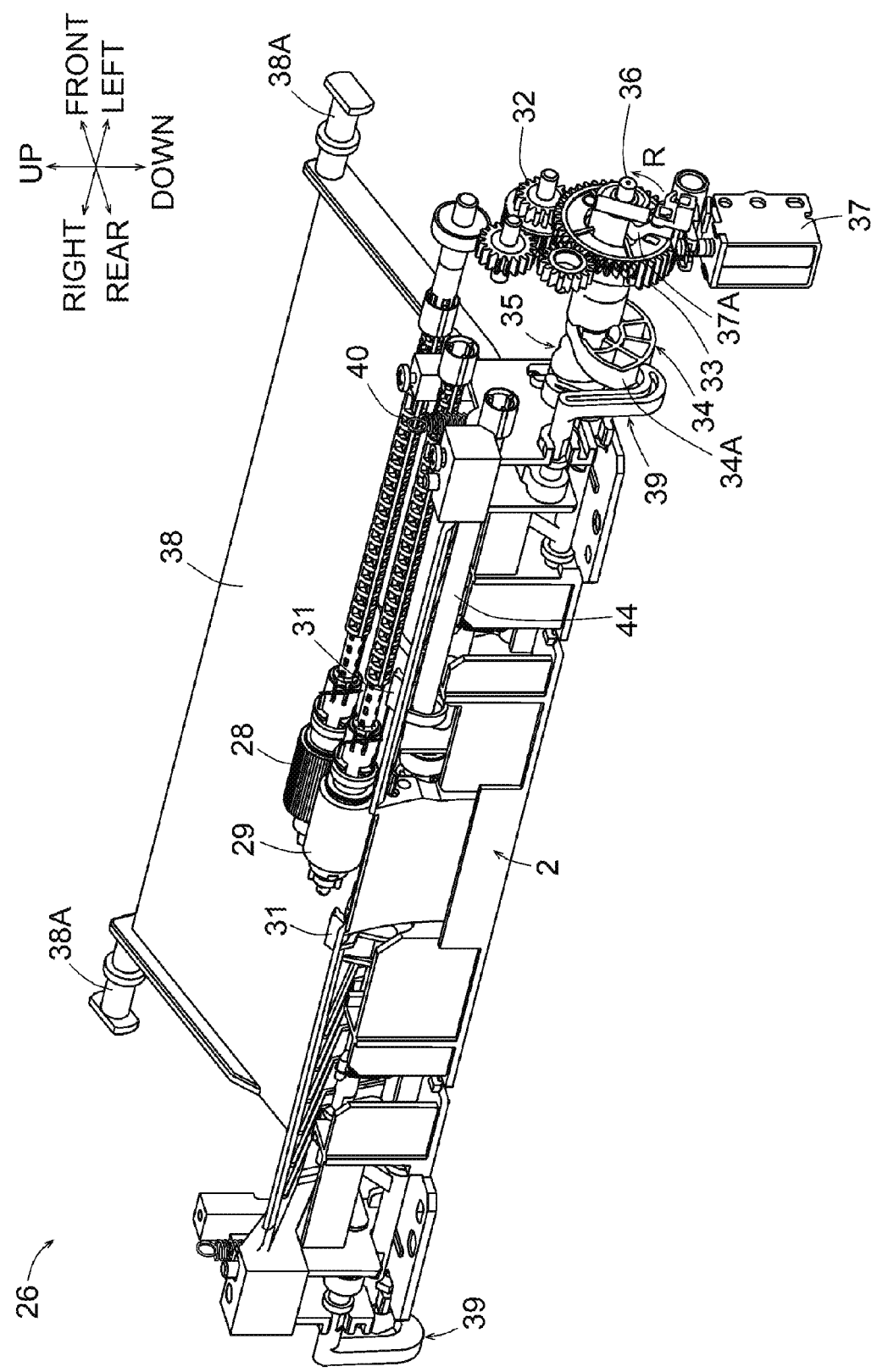
FIG. 3 is a rear perspective view showing the substantial elements of the MP feed mechanism.

The MP feed mechanism 26 includes, as described above, the MP tray 27, the pickup roller 28, the separation roller 29, the retard roller 30, and the return latches 31, and further includes, as shown in FIGS. 2 and 3, a feed gear 32, a sector gear 33, a pair of left and right first cams 34, a pair of left and right second cams 35, a second shaft 36, and a solenoid 37.

Figure 4:
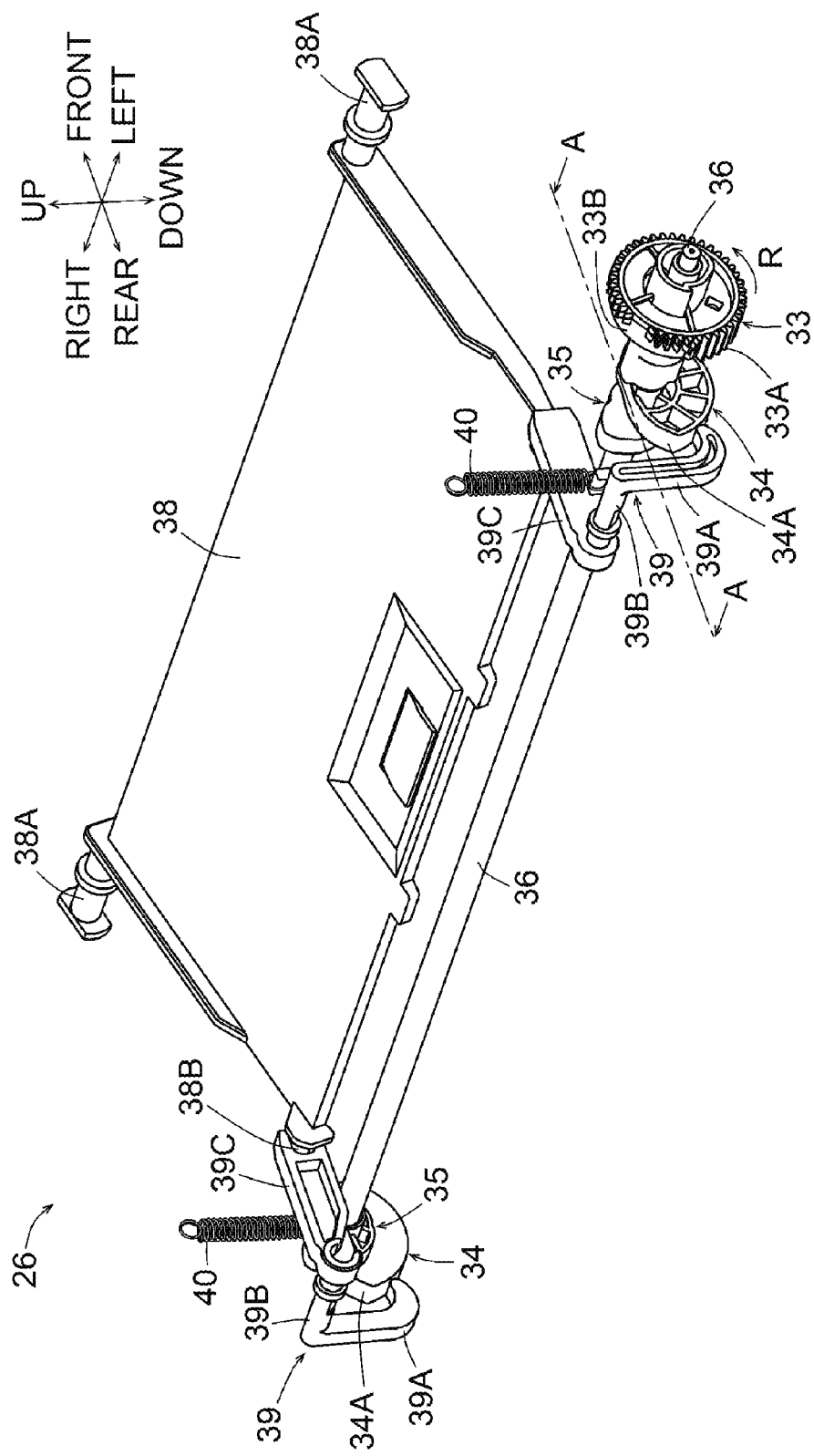
FIG. 4 is a rear perspective view of a pressure plate and a drive mechanism therefor of the MP feed mechanism.
Figure 5:
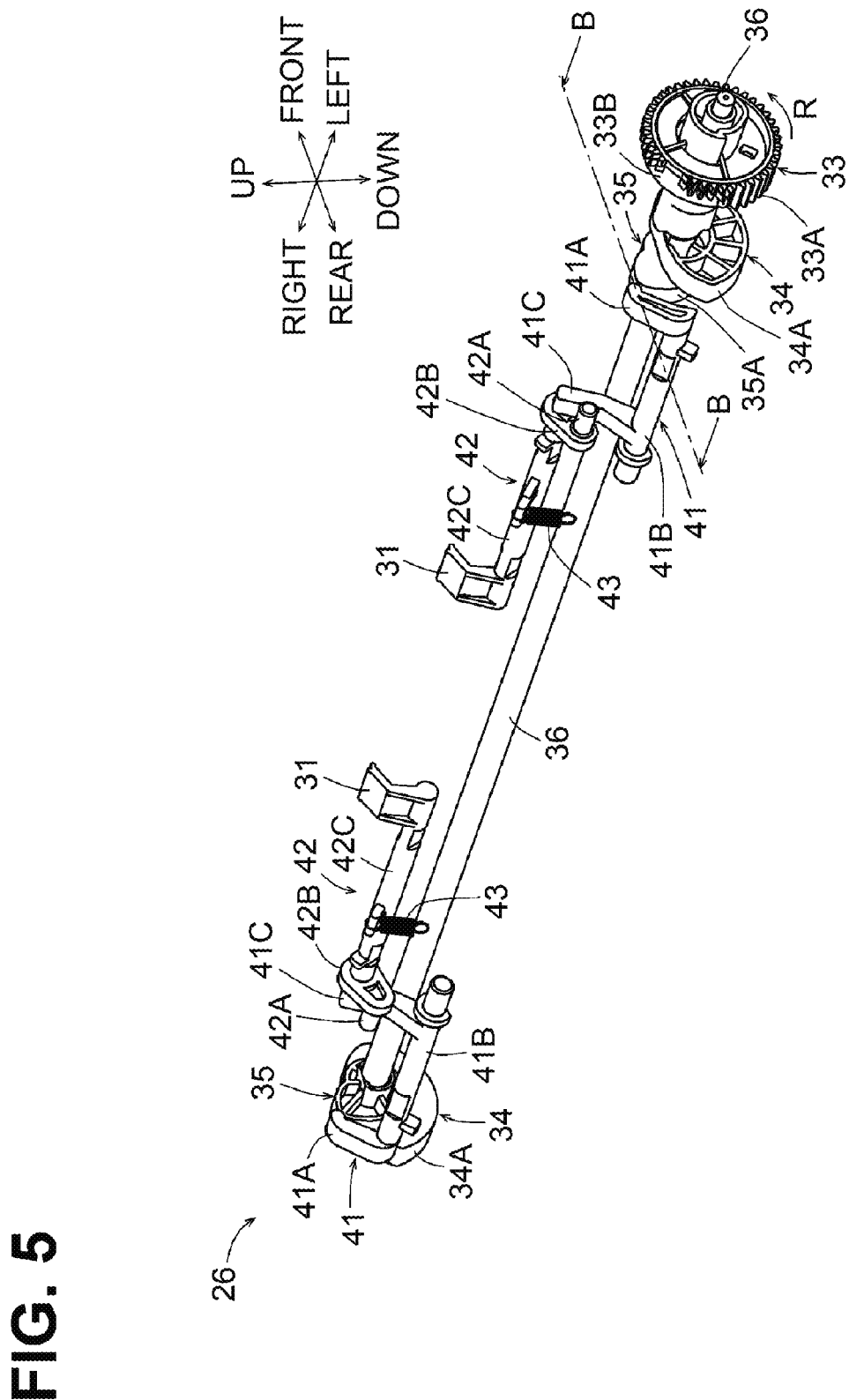
FIG. 5 is a rear perspective view of return latches and a drive mechanism therefor of the MP feed mechanism.
Figure 6:
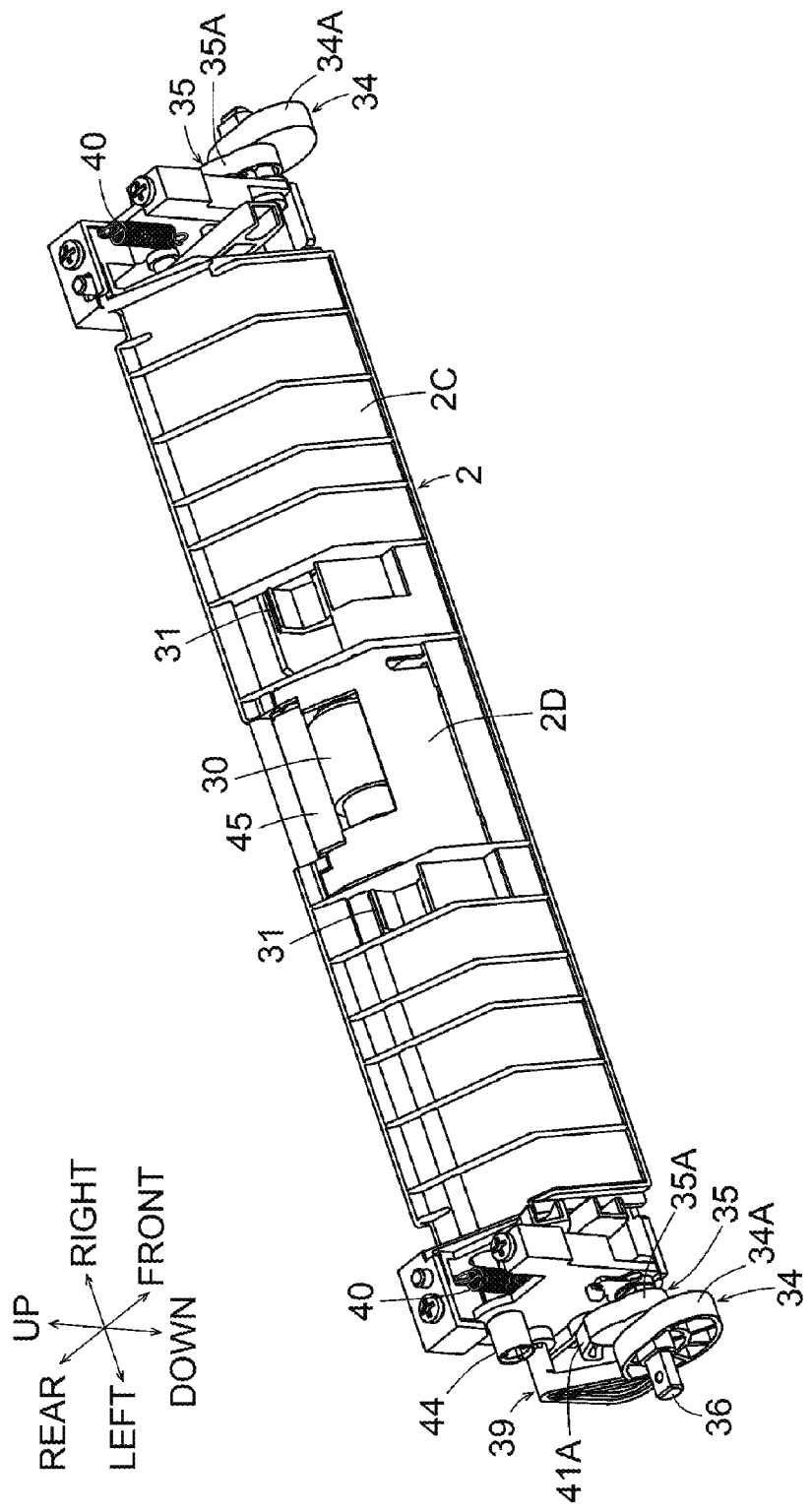
FIG. 6 is a front perspective view of a retard roller, the return latches, and their surrounding elements of the MP feed mechanism.
Figure 7:
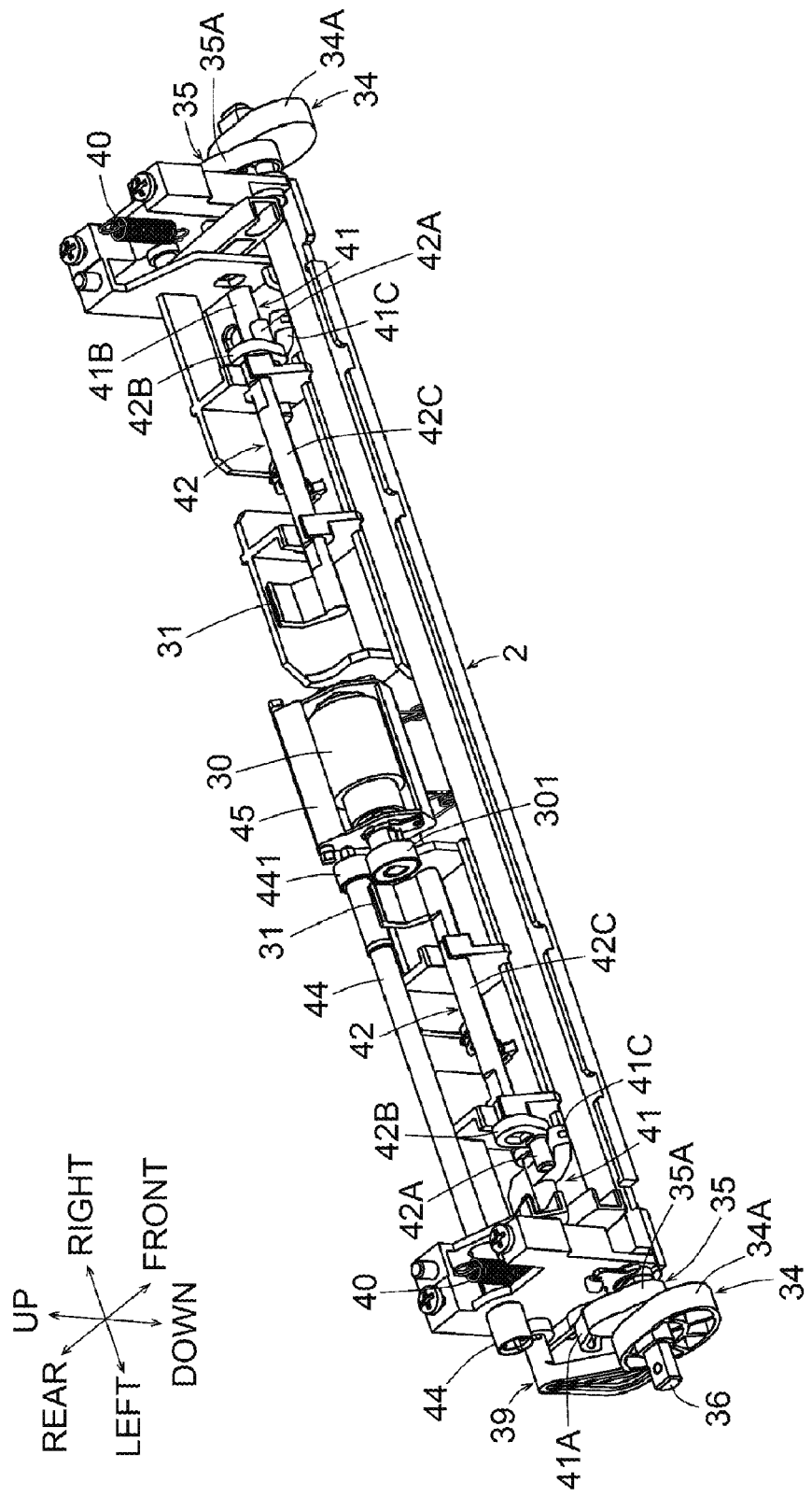
FIG. 7 is a front perspective view of the same elements shown in FIG. 6 but without a transport cover.

The MP feed mechanism 26 further includes, as shown in FIG. 4, a pressure plate 38, a pair of left and right first levers 39, and a pair of left and right first springs 40. The MP feed mechanism 26 further includes, as shown in FIG. 5, a pair of left and right second levers 41, a pair of left and right third levers 42, and a pair of left and right second springs 43. The MP feed mechanism 26 further includes, as shown in FIGS. 6 and 7, a first shaft 44 and a retard roller holder 45.

The first cams 34, the second cams 35, the first levers 39, the second levers 41, the third levers 42, the first springs 40, and the second springs 43 are provided in pair, one on the right side and the other on the left side of the MP feed mechanism 26. Therefore, hereinafter for brevity, the first cam 34, the second cam 35, the first lever 39, the second lever 41, the third lever 42, the first spring 40, and the second spring 43 on only one of the right and left sides will be basically described.

As shown in FIGS. 2 and 3, the feed gear 32 meshes with the sector gear 33 and with a gear train connected to the pickup roller 28 to transmit a driving force from the sector gear 33 to the pickup roller 28.

The sector gear 33 is fixed to the second shaft 36 and rotates, by a driving force from the motor 4, in a direction of arrow R. As shown in FIG. 4, the sector gear 33 has a mesh area 33A which meshes with the feed gear 32, and an unmesh area 33B which does not mesh with the feed gear 32. When the mesh area 33A is meshed with the feed gear 32, the driving force from the motor 4 is transmitted to the feed gear 32 via the sector gear 33 so that the pickup roller 28 rotates. On the other hand, when the unmesh area 33B faces the feed gear 32, the driving force from the motor 4 is not transferred to the feed gear 32. The feed gear 32 is freely rotatable, and the pickup roller 28 is freely rotatable in a forward direction and in a reverse direction.

The first cam 34 is fixed to the second shaft 36 and rotates by rotation of the sector gear 33. The first cam 34 has, at its outer peripheral surface, a first cam surface 34A which contacts the first lever 39 to transmit to the first lever 39 a driving force for moving the pressure plate 38.

As shown in FIG. 5, the second cam 35 is fixed to the second shaft 36 and rotates by rotation of the sector gear 33. The second cam 35 has, at its outer peripheral surface, a second cam surface 35A which contacts the second lever 41 to transmit to the second lever 41 a driving force for moving the return latch 31.

As shown in FIG. 3, the second shaft 36 supports the sector gear 33, the first cam 34, and the second cam 35 and rotates by rotation of the sector gear 33. The solenoid 37 moves a latch 37A for latching the sector gear 33 between a latching position and a released position. The sector gear 33 is restricted from rotating when the latch 37A is at the latching position, and resumes rotating when the latch 37A moves from the latching position to the released position.

The pressure plate 38 is disposed at the MP tray 27 and has a plate shape to support a plurality of sheets S when the MP tray 27 is at the usable position. As shown in FIG. 4, the pressure plate 38 includes, at its left front and right front ends, pressure-plate pivot shafts 38A rotatably supported by the MP tray 27. The pressure plate 38 further includes, at its rear left and rear right ends, pressure-plate swing shafts 38B swingably supported by the first levers 39. Thus, the pressure plate 38 is movable between a supply position where the pressure-plate swing shafts 38B are raised such that the sheets S are in press-contact with the pickup roller 28, and a non-supply position where the pressure-plate swing shafts 38B are lowered such that the sheets S are spaced from the pickup roller 28. Totally, the pressure plate 38 is movable between an upper position and a lower position. At the upper position, a topmost sheet S on the pressure plate 38 may be in press-contact with the pickup roller 28. At the lower position, the press-contact may be released.

The first lever 39 contacts the first cam surface 34A and supports a corresponding pressure-plate swing shaft 38B to transmit a driving force from the first cam 34 to the pressure plate 38. The first lever 39 includes a first contact 39A, a first pivot shaft 39B, and a first lever portion 39C. The first contact 39A is a J-shaped portion whose distal end contacts the first cam surface 34A.

The first pivot shaft 39B is a portion extending inward in the left-right direction from an upper end of the first contact 39A and rotatably supported by the housing 2. When the MP tray 27 is at the usable position, a rear end of the first lever portion 39C is fixed to the first pivot shaft 39B, and a front end of the first lever portion 39C supports the pressure-plate swing shaft 38B. The first spring 40 is a tension spring coupled, at its lower end, to the first lever portion 39C and, at its upper end, to the housing 2 and urges the first lever portion 39C upward.

According to the above-described first lever 39 and the first spring 40, when the first contact 39A is guided along the first cam surface 34A, the first contact 39A and the first lever portion 39C swing integrally about the first pivot shaft 39B. The first lever portion 39C thus causes the pressure plate 38 to swing vertically between the supply position and the non-supply position.

As shown in FIG. 5, the second lever 41 contacts the second cam surface 35A to transmit a driving force from the second cam 35 to the third lever 42. The second lever 41 includes a second contact 41A, a second pivot shaft 41B, and a second lever portion 41C. The second contact 41A is a J-shaped portion whose distal end contacts the second cam surface 35A. The second pivot shaft 41B is a portion extending inward in the left-right direction from a lower end of the second contact 41A and rotatably supported by the housing 2. The second lever portion 41C extends toward the upper front from an inner end of the second pivot shaft 41B to contact the third lever 42.

The third lever 42 contacts the second lever portion 41C and moves the return latch 31 due to a driving force from the second lever 41 and an urging force of the second spring 43. The third lever 42 includes a third contact 42A, a third lever portion 42B, a third pivot shaft 42C, and the return latch 31. The third contact 42A is a cylindrical boss extending in the left-right direction and its outer peripheral surface contacts the second lever portion 41C.

The third lever portion 42B contacts the third contact 42A at the rear end of the third lever portion 42B and extends frontward. The third pivot shaft 42C is a portion extending inward in the left-right direction from a front end of the third lever portion 42B and rotatably supported by the housing 2. The return latch 31 extends toward the upper front from an inner end of the third pivot shaft 42C. The second spring 43 is a tension spring coupled, at its upper end, to the third pivot shaft 42C and, at its lower end, to the housing 2 and urges the third pivot shaft 42C such that the third contact 42A is urged in a direction to contact the second lever portion 41C.

Figure 10:
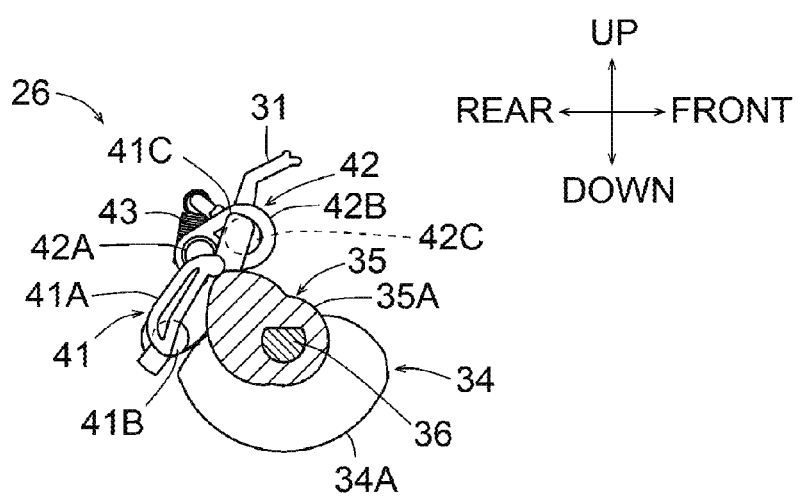
FIG. 10 is a cross-sectional view taken along line B-B in FIG. 5.

As shown in FIG. 10, the second shaft 36 is disposed further to the front than the third pivot shaft 42C, i.e., upstream of the third pivot shaft 42C in the sheet transport direction. The second shaft 36 is disposed adjacent to the pressure plate 38, and thus the MP feed mechanism 26 is downsized.

The second lever 41 is disposed at least partially below the third pivot shaft 42C. The second lever 41 which contacts the second cam 35 is disposed near the second cam 35, and thus the second cam 35 is downsized.

According to the above-described second lever 41, the third lever 42, and the first spring 40, when the second contact 41A is guided along the second cam surface 35A, the second contact 41A and the second lever portion 41C swing integrally about the second pivot shaft 41B. Thus, the third contact 42A moves in contact with the second lever portion 41C, and the third lever portion 42B and the return latch 31 swing integrally about the third pivot shaft 42C. In short, the return latch 31 moves between the retracted position and the protruding position.

As shown in FIGS. 6 and 7, the first shaft 44 transmits a driving force from the motor 4 to the retard roller 30. A gear 441 is disposed at a right end of the first shaft 44. The gear 441 meshes with a gear 301 disposed at a left end of the rotation shaft of the retard roller 30 to rotate the retard roller 30.

As shown in FIG. 6, the housing 2 includes a transport cover 2C covering the first shaft 44, the second lever 41, and the third lever 42, and a holder cover 2D covering the retard roller holder 45. The transport cover 2C and the holder cover 2D have a function to guide a lower surface of a sheet S being transported.

As shown in FIGS. 6 and 7, the retard roller holder 45 rotatably supports the retard roller 30. The retard roller holder 45 is pivotably supported by the transport cover 2C and biased upward by a spring. In a state where the holder cover 2D is removed, the retard roller holder 45 is attachable and detachable in a vertical direction orthogonal to the rotation axis 30A (refer to FIG. 11) of the retard roller 30. The retard roller holder 45, when attached and detached, does not interfere with the return latches 31 disposed to the left and right of the retard roller 30.

Figure 11:
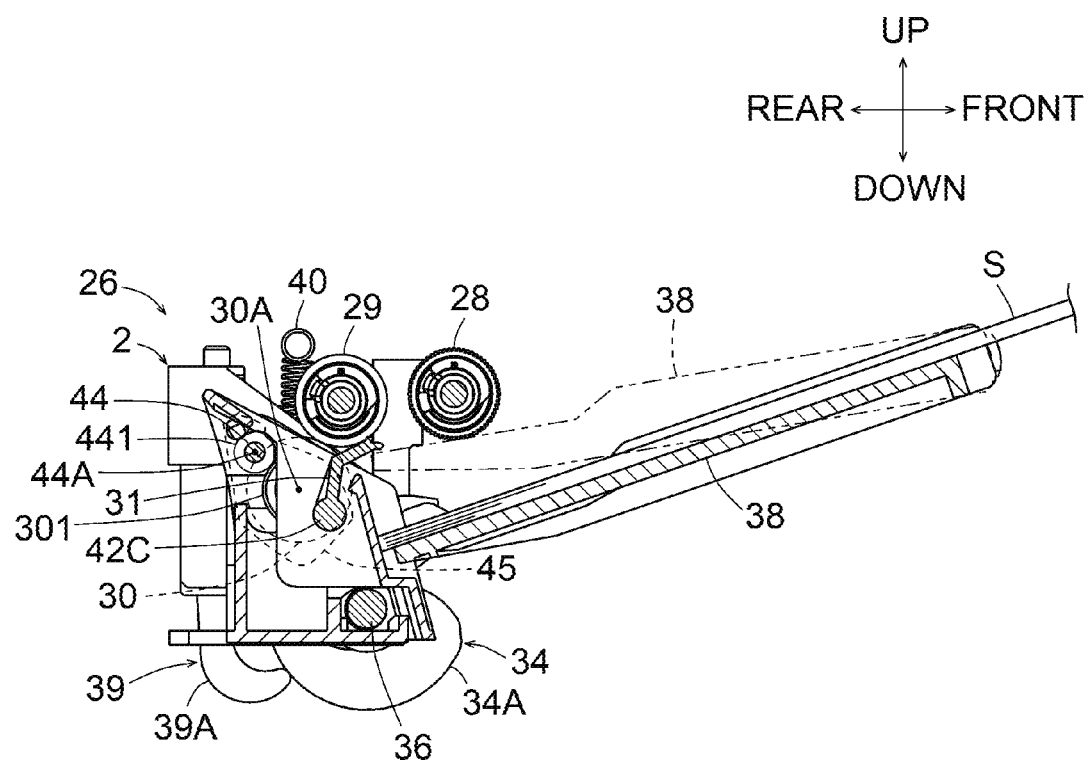
FIG. 11 is a cross-sectional view of the return latch and its surrounding elements of the MP feed mechanism.
Figure 12:
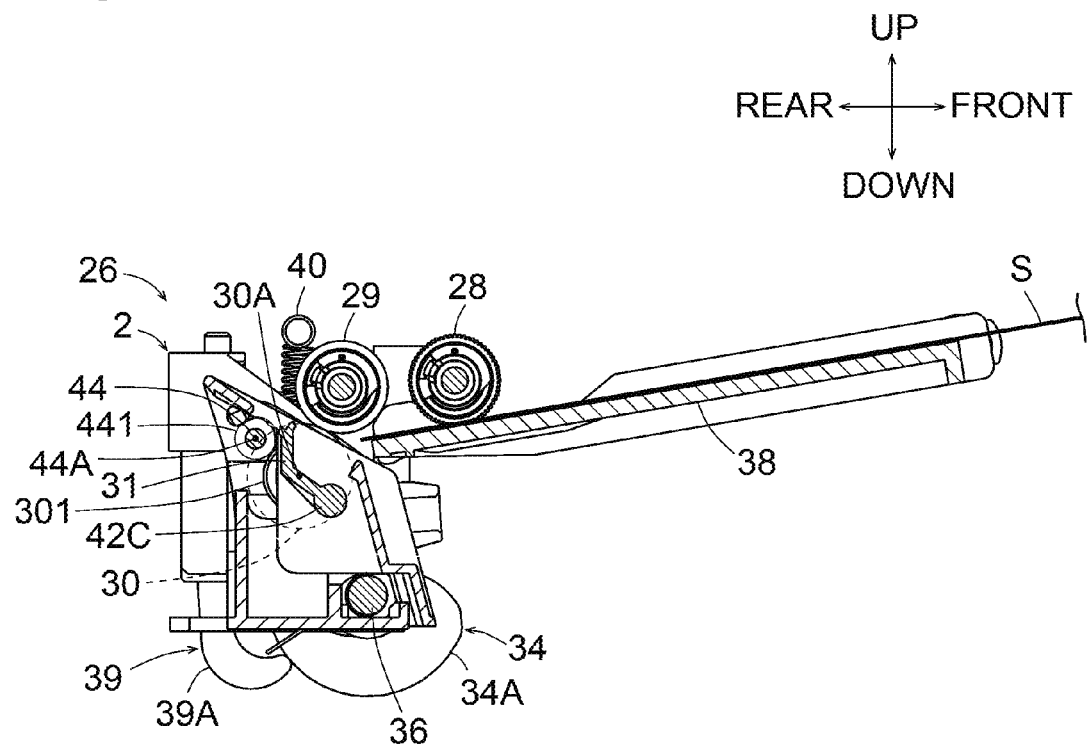
FIG. 12 is a cross-sectional view of the return latch and its surrounding elements of the MP feed mechanism.

As shown in FIGS. 11 and 12, a rotation axis 44A of the first shaft 44 is different in position from the rotation axis 30A of the retard roller 30. When viewed in a direction of the rotation axis 30A of the retard roller 30, the rotation axis 30A of the retard roller 30 overlaps a moving range of the return latch 31. The return latch 31 disposed adjacent to the nip point of the retard roller 30 improves separation performance of sheets S.

As shown in FIG. 11, the first shaft 44 is disposed downstream of the rotation axis 30A of the retard roller 30 in the sheet transport direction. The third pivot shaft 42C is disposed upstream of the rotation axis 30A of the retard roller 30 in the sheet transport direction. When viewed in the direction of the rotation axis of the retard roller 30, the third pivot shaft 42C is disposed at a position overlapping the retard roller holder 45. Such configurations may downsize the MP feed mechanism 26 in the sheet transport direction.

In the MP feed mechanism 26 structured as described above, the sector gear 33 connected to the pickup roller 28, the first cam 34 connected to the pressure plate 38, and the second cam 35 connected to the return latch 31 are disposed on the same second shaft 36. Such configuration may reduce the number of shafts, and may also reduce a rotational lag between the sector gear 33, the first cam 34, and the second cam 35 so as to improve the accuracy in operation timing of the pickup roller 28, the pressure plate 38, and the return latch 31.

Preferred operation timings of the pickup roller 28, the pressure plate 38, and the return latch 31 will now be described. First, an operation timing of the pickup roller 28 and the pressure plate 38 is determined such that, at the start of feeding sheets S from the MP tray 27, the pressure plate 38 is raised to the supply position to make the sheets S to press-contact the pickup roller 28 before a driving force is transmitted to the pickup roller 28. In other words, the pressure plate 38 reaches the supply position before the pickup roller 28 starts rotating. Such operation timings may reduce skewing of sheets S and enable stable feed of sheets S.

Figure 8:
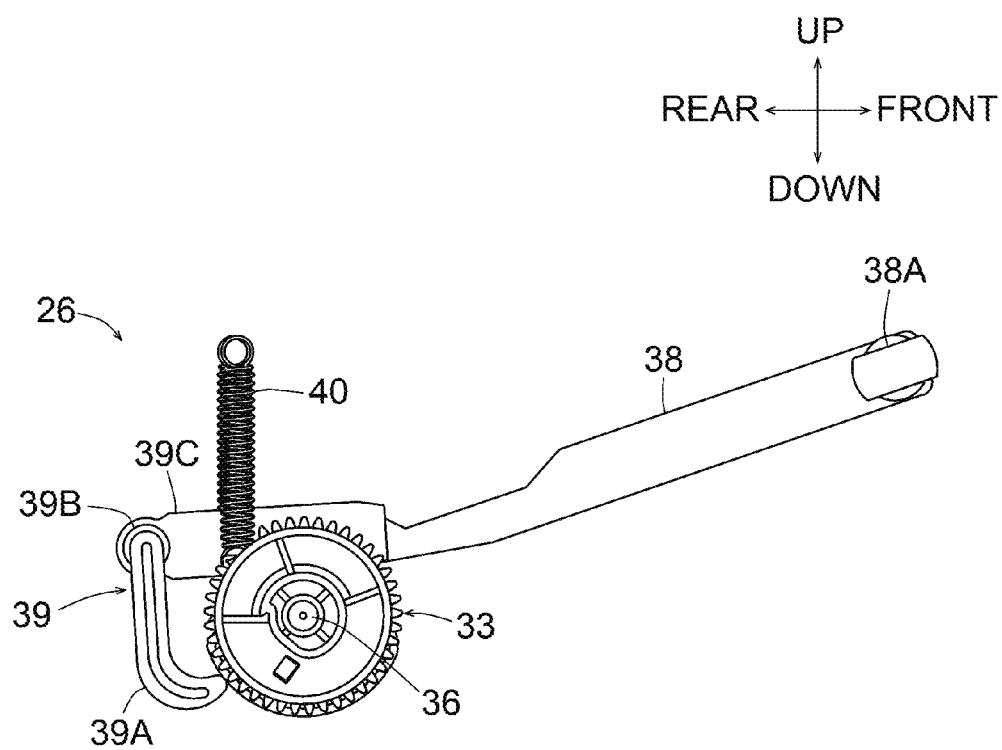
FIG. 8 is a left side view of the pressure plate and the drive mechanism of FIG. 4.
Figure 9:
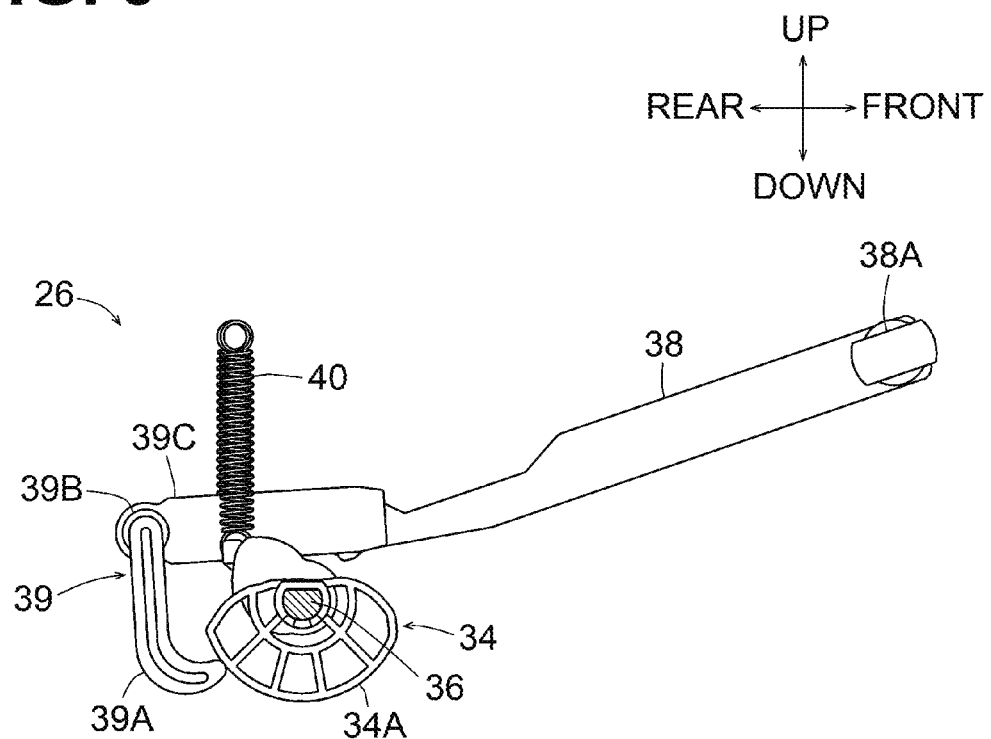
FIG. 9 is a cross-sectional view taken along line A-A in FIG. 4.

In order to implement such an operation timing, as shown in FIGS. 8 and 9, the first cam 34 is shaped so as to cause the pressure plate 38 to move from the non-supply position to the supply position while the unmesh area 33B faces the feed gear 32 during rotation of the sector gear 33.

Further, an operation timing of the pressure plate 38 and the return latch 31 is determined such that, after the press-contact of sheets S by the pressure plate 38 against the pickup roller 28 is released, the return latch 31 at the retracted position moves to the protruding position. In other words, the return latch 31 reaches the protruding position after the pressure plate 38 starts moving from the supply position. Such movement of the return latch 31 may help one or more sheets S fed together with a separated sheet S toward the pressure plate 38 return smoothly without interference with the pickup roller 28.

In order to implement such an operation timing, as shown in FIG. 10, the second cam 35 is shaped so as to cause the return latch 31 to start moving from the retracted position toward the protruding position after the first cam 34 causes the pressure plate 38 to start moving from the supply position toward the non-supply position.

In the above-described structure, as shown in FIG. 11, a distal end of the return latch 31 at the protruding position is preferably located upstream, in the sheet transport direction, of a downstream end of the pressure plate 38 at the supply position (a position shown by a two-dot chain line in FIG. 11). With this structure, the distal end of the return latch 31 reaches a position overlapping the pressure plate 38, thereby reliably returning one or more sheets S fed together with a separated sheet S to the pressure plate 38.

Operation of MP Feed Mechanism

Initially, in a state where the solenoid 37 is off, the latch 37A is at the latching position, and the sector gear 33 is stopped, the first cam 34 and the second cam 35 are each at a non-transmission position not to transmit a driving force, the unmesh area 33B of the sector gear 33 faces the feed gear 32 to leave the pickup roller 28 and the separation roller 29 freely rotatable, and, as shown in FIG. 11, the return latch 31 is at the protruding position and the pressure plate 38 is at the non-supply position.

When the solenoid 37 is turned on in the above-described state, the latch 37A moves to the released position and the sector gear 33 starts rotating. As the sector gear 33 rotates, the second shaft 36 rotates to cause the first cam 34 and the second cam 35 to start rotating. Thereafter, the second cam 35 moves away from the second contact 41A of the second lever 41. Moving away from the second contact 41A causes the third lever 42 to pivot due to an urging force of the second spring 43 and the return latch 31 to start moving from the protruding position toward the retracted position.

Subsequently, the first cam 34 moves away from the first contact 39A of the first lever 39. Moving away from the first contact 39A causes the first lever 39 to pivot due to an urging force of the first spring 40 and the pressure plate 38 to start moving from the non-supply position toward the supply position. While the pressure plate 38 is moving, the return latch 31 reaches the retracted position and then the pressure plate 38 reaches the supply position, as shown in FIG. 12. When several sheets are stacked on the pressure plate 38, the pressure plate 38 reaches the supply position after the return latch 31 reaches the retracted position. When the large number of sheets S (that is, more than the several pieces) on the pressure plate 38 are stacked on the pressure plate 38, the pressure plate 38 reaches the supply position before the return latch 31 reaches the retracted position.

In a state where the pressure plate 38 is at the supply position, the mesh area 33A of the sector gear 33 meshes with the feed gear 32 and the pickup roller 28 and the separation roller 29 start rotating. Accordingly, the pickup roller 28 feeds sheets S on the pressure plate 38 and the separation roller 29 separates the sheets S one from another.

Thereafter, the unmesh area 33B of the sector gear 33 faces the feed gear 32 to stop driving force supply to the pickup roller 28, which is brought into a state to be rotated by a sheet S being transported. When the unmesh area 33B of the sector gear 33 faces the feed gear 32, the first cam 34 rotates to a transmission position to transmit a driving force and pushes the first contact 39A of the first lever 39. Pushing the first contact 39A causes the first lever 39 to pivot and the pressure plate 38 to start moving from the supply position toward the non-supply position.

Thereafter, when the pressure plate 38 reaches the non-supply position, the first cam 34 reaches the transmission position to maintain the pressure plate 38 at the non-supply position. When the first cam 34 reaches the transmission position, the second cam 35 rotates to the transmission position and pushes the second contact 41A of the second lever 41. Pushing the second contact 41A causes the second lever 41 to pivot and the return latch 31 to start moving from the retracted position toward the protruding position.

While the return latch 31 is moving, driving force supply is stopped to the separation roller 29, which is brought into a state to be rotated by a sheet S being transported. After the driving force supply to the separation roller 29 is stopped, the return latch 31 returns one or more sheets S fed together with a separated sheet S toward the pressure plate 38 while moving toward the protruding position. When the sector gear 33 completes one rotation, the second cam 35 reaches the non-transmission position, the return latch 31 reaches the protruding position, and the one or more sheets S fed together with the separated sheet S are returned to the pressure plate 38.

Others

In the above-described illustrative embodiment, a sheet feeder according to an aspect of the disclosure is applied, by way of example, to the MP feed mechanism 26, but may be applied to the sheet cassette 10 and its feed mechanism 20.

What is claimed is:

1. A sheet feeder comprising:
    a separation roller configured to rotate in a forward direction to separate a sheet and transport the separated sheet in a sheet transport direction;
    a retard roller configured to form, together with the separation roller, a nip point and rotate in a reverse direction to return a sheet in a direction opposite to the sheet transport direction;
    a return latch configured to move from a retracted position to a protruding position to return a sheet remaining after separation by the separation roller to a position upstream of the nip point in the sheet transport direction, the return latch, when at the retracted position, being retracted from a sheet transport path and, when at the protruding position, protruding to the sheet transport path; and
    a first shaft configured to supply a driving force to the retard roller,
    wherein a rotation axis of the first shaft is different in position from a rotation axis of the retard roller, and the rotation axis of the retard roller overlaps a moving range of the return latch when viewed in a direction of the rotation axis of the retard roller.

2. The sheet feeder according to claim 1, further comprising:
    a retard roller holder rotatably supporting the retard roller; and
    a pivot shaft configured to pivot the return latch between the retracted position and the protruding position,
    wherein the first shaft is disposed downstream of the rotation axis of the retard roller in the sheet transport direction, and
    wherein the pivot shaft is disposed upstream of the rotation axis of the retard roller in the sheet transport direction and overlaps the retard roller holder when viewed in a direction of the rotation axis of the retard roller.

3. The sheet feeder according to claim 2, further comprising:
    a sheet tray configured to support sheets and including a pressure plate movable between a supply position to supply a sheet and a non-supply position to supply no sheet; and
    a second shaft configured to supply a driving force to the pressure plate and the pivot shaft.

4. The sheet feeder according to claim 3, wherein the second shaft is disposed upstream of the pivot shaft in the sheet transport direction.

5. The sheet feeder according to claim 3, further comprising:
    a lever configured to pivot the pivot shaft; and a cam disposed at the second shaft and configured to drive the lever, wherein the lever is disposed at least partially below the pivot shaft.

6. The sheet feeder according to claim 3, wherein the return latch is configured to move to the protruding position after the pressure plate moves to the non-supply position.

7. The sheet feeder according to claim 2, wherein the return latch is disposed on each of opposite ends of the retard roller in the direction of the rotation axis.

8. The sheet feeder according to claim 7, wherein the retard roller holder is detachably attachable in a direction orthogonal to the rotation axis of the retard roller.

9. An image forming apparatus comprising:
the sheet feeder according to claim 1; and
an image forming unit configured to form an image on a sheet transported by the sheet feeder.

10. A sheet feeder comprising:
a pressure plate movable between an upper position and a lower position;
a separation roller configured to rotate in a forward direction and transport a sheet in a sheet transport direction;
a retard roller disposed to form, together with the separation roller, a nip point and configured to rotate in a reverse direction opposite to the forward direction;
a return latch movable between a retracted position and a protruding position; and
a first shaft configured to supply a driving force to the retard roller, wherein a rotation axis of the first shaft is different in position from a rotation axis of the retard roller, and the rotation axis of the retard roller overlaps a moving range of the return latch when viewed in a direction of the rotation axis of the retard roller, wherein the return latch at the retracted position is retracted from a sheet transport path, wherein the return latch at the protruding position protrudes to the sheet transport path, and wherein the return latch is configured to reach the protruding position after the pressure plate starts moving from the upper position.

11. A sheet feeder according to claim 10, further comprising a pickup roller disposed upstream of the separation roller in the sheet transport direction and configured to rotate in a forward direction, wherein the pressure plate reaches the upper position before the pickup roller starts rotating.

* * * * *